(12) United States Patent
Bischoff

(10) Patent No.: US 7,008,015 B2
(45) Date of Patent: Mar. 7, 2006

(54) SEAT SUSPENSION ASSEMBLY

(76) Inventor: Eric Bischoff, 1075 Park Ave., Apartment 14A, New York, NY (US) 10128

( * ) Notice: Subject to any disclaimer, the term of this patent is extended or adjusted under 35 U.S.C. 154(b) by 0 days.

(21) Appl. No.: 10/737,010

(22) Filed: Dec. 16, 2003

(65) Prior Publication Data

US 2005/0127730 A1   Jun. 16, 2005

(51) Int. Cl.
*B60N 2/42* (2006.01)
*B60N 2/02* (2006.01)
*F16M 13/00* (2006.01)

(52) U.S. Cl. .................. 297/216.1; 297/296; 297/299; 248/622

(58) Field of Classification Search ........... 297/216.16, 297/216.17, 296, 297, 299, 353, 344.1, 344.12; 248/622, 623, 624
See application file for complete search history.

(56) References Cited

U.S. PATENT DOCUMENTS

| | | | |
|---|---|---|---|
| 1,093,741 A | 4/1914 | Stoll | |
| 1,127,413 A | 2/1915 | Davis | |
| 1,400,974 A | 12/1921 | Parker | |
| 1,774,555 A | 9/1930 | Horsley et al. | |
| 2,298,230 A | 10/1942 | Radke | |
| 2,331,990 A | 10/1943 | McArthur | |
| 2,637,368 A | 5/1953 | Cotton | |
| 2,787,315 A | 4/1957 | Siebert | |
| 2,892,482 A | 6/1959 | Beoletto | |
| 2,893,470 A | 7/1959 | Peller | |
| 2,971,566 A * | 2/1961 | Negroni | 297/303.4 |
| 3,163,409 A | 12/1964 | Running et al. | |
| 3,186,674 A | 6/1965 | O'Link | |
| 3,325,136 A | 6/1967 | Radke et al. | |
| 3,601,351 A | 8/1971 | Ambrosius | |
| 3,985,388 A * | 10/1976 | Hogan | 297/216.17 |
| 4,047,759 A | 9/1977 | Koscinski | |
| 4,128,217 A * | 12/1978 | Mazelsky | 244/122 R |
| 4,150,805 A * | 4/1979 | Mazelsky | 244/122 R |
| 4,362,335 A * | 12/1982 | Drabert et al. | 297/300.3 |
| 4,401,342 A | 8/1983 | Andersson | |
| 4,408,738 A * | 10/1983 | Mazelsky | 244/122 R |
| 4,423,848 A * | 1/1984 | Mazelsky | 244/122 R |
| 4,709,649 A | 12/1987 | Wann | |
| 4,809,944 A | 3/1989 | Smith et al. | |
| 4,977,848 A | 12/1990 | Currey | |

(Continued)

OTHER PUBLICATIONS

Glide Ryde Marine Suspension Seating, product literature and pictures of device, undated.

(Continued)

*Primary Examiner*—Peter M. Cuomo
*Assistant Examiner*—Sarah C. Burnham
(74) *Attorney, Agent, or Firm*—Hoffmann & Baron, LLP

(57) ABSTRACT

A seat suspension assembly including a base including a first pair of spaced legs adapted to be securable to a support structure. The first pair of legs is connected to a back member. A seat frame is adapted to support a seating surface and disposed between the first pair of spaced legs of the base. The seat frame is movably connected to the base. The seat frame includes a first guide engageable with one of the pair of legs. The first guide permits controlled movement of the seat frame relative to the base. A suspension extends between the seat frame and the base for regulating the motion of the seat frame relative to the base.

28 Claims, 5 Drawing Sheets

U.S. PATENT DOCUMENTS

| | | | |
|---|---|---|---|
| 5,044,299 A | | 9/1991 | Frank |
| 5,044,587 A | | 9/1991 | Degen |
| 5,169,112 A | | 12/1992 | Boyles et al. |
| 5,176,355 A | | 1/1993 | Carter |
| 5,234,203 A | | 8/1993 | Smith |
| 5,273,240 A | * | 12/1993 | Sharon ................... 244/122 R |
| 5,273,260 A | | 12/1993 | Nagata |
| 5,294,085 A | | 3/1994 | Lloyd et al. |
| 5,309,861 A | | 5/1994 | Mardikian |
| 5,324,095 A | | 6/1994 | Yamauchi |
| 5,367,978 A | | 11/1994 | Mardikian |
| 5,451,094 A | | 9/1995 | Templin et al. |
| 5,542,371 A | | 8/1996 | Harvey et al. |
| 5,642,916 A | | 7/1997 | Dybro et al. |
| 5,676,336 A | | 10/1997 | Nefy et al. |
| 5,735,509 A | | 4/1998 | Gryp et al. |
| 5,758,859 A | | 6/1998 | Gonzalez |
| 6,158,810 A | * | 12/2000 | Galloway ................ 297/354.1 |
| 6,237,889 B1 | | 5/2001 | Bischoff |
| 6,257,663 B1 | | 7/2001 | Swierczewski |

OTHER PUBLICATIONS

Industrial Seating Inc. product sheet, Model #4805S, undated.

Mariner Suspension Seats Brochure, Seats Incorporated, Reedsburg, Wisconsin, 1990.

H.O. Bostrom Seaport™ Series Brochure, H.O. Bostrom Company, Inc., Waukesha, Wisconsin, undated.

Wave Impact Seating Systems, Grand Products Company, product literature, undated.

Seaspension™, Land-Mar Products, Inc., product literature, undated.

Garelick Active Seat Suspension Unit, product literature, 1999.

Marine Seats—Suspension, Bentley's Manufacturing Inc., product literature, 1999.

Attwood Avenir Bucket Seat with Flip Up Bolster, Bart's Water Sports, product literature, undated.

* cited by examiner

SEAT SUSPENSION ASSEMBLY

FIELD OF THE INVENTION

The present invention relates to a seat suspension assembly having shock absorbing capabilities for accommodating shock waves imparted thereto. More particularly, the present invention relates to a seat suspension assembly for use in a watercraft or land vehicle having a shock accommodating and dissipating capability for isolating an occupant of the seat from shock waves imparted on the watercraft or vehicle.

BACKGROUND OF THE INVENTION

It is well known that occupants of watercrafts, especially small boats, may experience a jarring and unsettling ride as the boat moves through the water. As the waves impact the hull of the boat, the shock waves are almost directly transferred to the occupant. Such shock waves can seriously diminish the enjoyment and comfort of the boat passengers. In extreme cases, the harshness of the ride may lead to spinal injuries or at the very least aggravate preexisting spinal conditions. The discomfort is especially prevalent if the boat is relatively small and is moving fast through choppy water.

The harshness of the ride is often only slightly mitigated by the typical boat seat. Standard boat seats are rigidly secured to the deck of the boat and include a cushion material which provides only a minimal amount of shock accommodation and dissipation. Therefore, an occupant sitting in a typical boat seat is subjected to some discomfort as the boat travels through the water. Such discomfort is especially troublesome if the occupant is suffering from a sore back or neck and may lead to individuals refraining from engaging in watercraft associated activities. In addition to the discomfort resulting from the motion of the boat as it travels through the water, the driver of the boat may find it difficult to maintain control since they are being tossed about. Such a jarring ride makes it difficult to hold the steering device steady and to maintain control over the throttle.

The experience of being tossed about in one's seat can also be experienced by those riding in land vehicles, especially off-road passenger vehicles and/or construction vehicles. Even though such vehicles include suspension systems which are designed to somewhat isolate the occupants from the irregularities in the roadway, the suspension systems are limited in their capacity to do that and the passengers still can receive significant vibrations especially if the vehicle is moving rapidly over rough terrain.

Attempts have been made in the prior art in order to accommodate shock waves imparted to boats or land vehicles. One such attempt is disclosed in U.S. Pat. No. 5,044,229 to Frank. Frank discloses a seat construction for a boat that comprises a support sleeve arranged for mounting on a boat with a longitudinal axis vertical to the boat. An elongate seat support element is slidable longitudinally of the sleeve and is configured and is confined by an upper bearing element of the sleeve and a lower bearing element of the sleeve. A spring is retained within the sleeve and adapted to permit the seat support element to extend therein. The seat support element is permitted to move under bias of the spring in a vertical direction. Therefore, the seat construction provides flexibility to the seat in order to accommodate vertical shock. However, the Frank device requires that the sleeve extend below the deck of the boat, which would require significant modifications in order to install this on an existing boat. Furthermore, there is no separate shock-dampening device; therefore, the occupant may end up bouncing up and down with the seat in an exaggerated manner in response to a shock wave hitting the boat.

U.S. Pat. No. 2,893,470 to Peller discloses an adjustable seat with shock adsorbing capabilities. The seat includes a pair of telescoping cylinders which contain a coil spring surrounding a hydraulic shock absorber. The height of the seat can be adjusted by rotation of a handle which, through a series of gears, adjusts the distance between the bottom of the shock absorber and the bottom of the surface to which the seat is mounted. In this design, the telescoping cylinders form a pedestal directly beneath the seating surface of the seat. Therefore, the seating surface must be spaced a significant distance from the mounting surface, which would make this design difficult to use in a retrofit situation.

Use of telescoping cylinders with a spring and shock absorbing apparatus formed therein is also disclosed in U.S. Pat. No. 1,400,974 to Parker. This design discloses the use of two pedestals formed underneath the seating surface.

U.S. Pat. No. 5,342,095 to Yamauchi discloses a suspension seat for an automotive vehicle including a seat frame which is vertically movably supported on a parallel link mechanism having front and rear links. A compression spring and shock absorber coaxially combined is provided and is installed between the upper backside of the portion of the seat frame and an arm portion connected to the rear link. The forward link includes a cross member which extends across the front of the seat underneath the cushion. Therefore, the space beneath the seat is not clear of restrictions.

In boating applications it is becoming ever more popular to provide seats having a seating section which can be selectively swung out of the way in order to allow the occupant to move from a seated position to a standing position. Being able to stand at the seat has various benefits including permitting an occupant to have increased visibility while still having access to the various boat controls.

Accordingly, it would be desirable to provide a seat and suspension system having a suspension system absorbing vibrations and impacts imparted thereto wherein the area beneath the seating surface of the seat is unobstructed thereby permitting a low profile design which is desired in both retrofit applications and applications requiring the seat to be swung out of the way allowing the occupant to move from a sitting position to a standing position.

SUMMARY OF THE INVENTION

It is an advantage of the present invention to provide a seat suspension assembly for isolating an occupant of the seat from shocks imparted to the assembly.

It is another advantage of the present invention to provide a seat suspension assembly including a base securable to a support structure and a seat frame movably secured to the base, wherein the motion is controlled by a suspension.

It is yet another advantage of the present invention to provide a seat suspension assembly wherein the area below a seating surface is free from obstructions.

In the efficient attainment of these and other advantages, the present invention provides a seat suspension assembly including a base having a first pair of spaced legs adapted to be securable to a support structure. The first pair of legs is connected to a back member. A seat frame is adapted to support a seating surface and disposed between the first pair of spaced legs of the base. The seat frame is movably connected to the base. The seat frame includes a first guide engageable with one of the pair of legs. The first guide permits controlled movement of the seat frame relative to the base. A suspension extends between the seat frame and the base for regulating the motion of the seat frame relative to the base.

The present invention further provides a seat suspension assembly securable to a support including a base securable to the support structure. The base includes a back member and a pair of spaced side rails extending outwardly from the back member. The back member and the pair of side rails form an open space. The assembly further includes a seating surface and a seat frame adapted to support the seating surface and the seat frame is generally disposed in the open space. The seat frame is movably connected in a guided manner to the frame. The seat frame includes a back support and a pair of spaced arms. The back support and the spaced arms form an opening, wherein an area below the seating surface is generally unobstructed providing unencumbered access to the support structure. A suspension extends between the seat frame and the base for regulating the motion of the seat frame relative to the base. The suspension is disposed outside of the opening created by the seat frame.

For a better understanding of the present invention, reference is made to the following detailed description to be read in conjunction with the accompanying drawings and the scope will be defined in the appended claims.

DETAILED DESCRIPTION OF THE PREFERRED EMBODIMENTS

Figure 1:
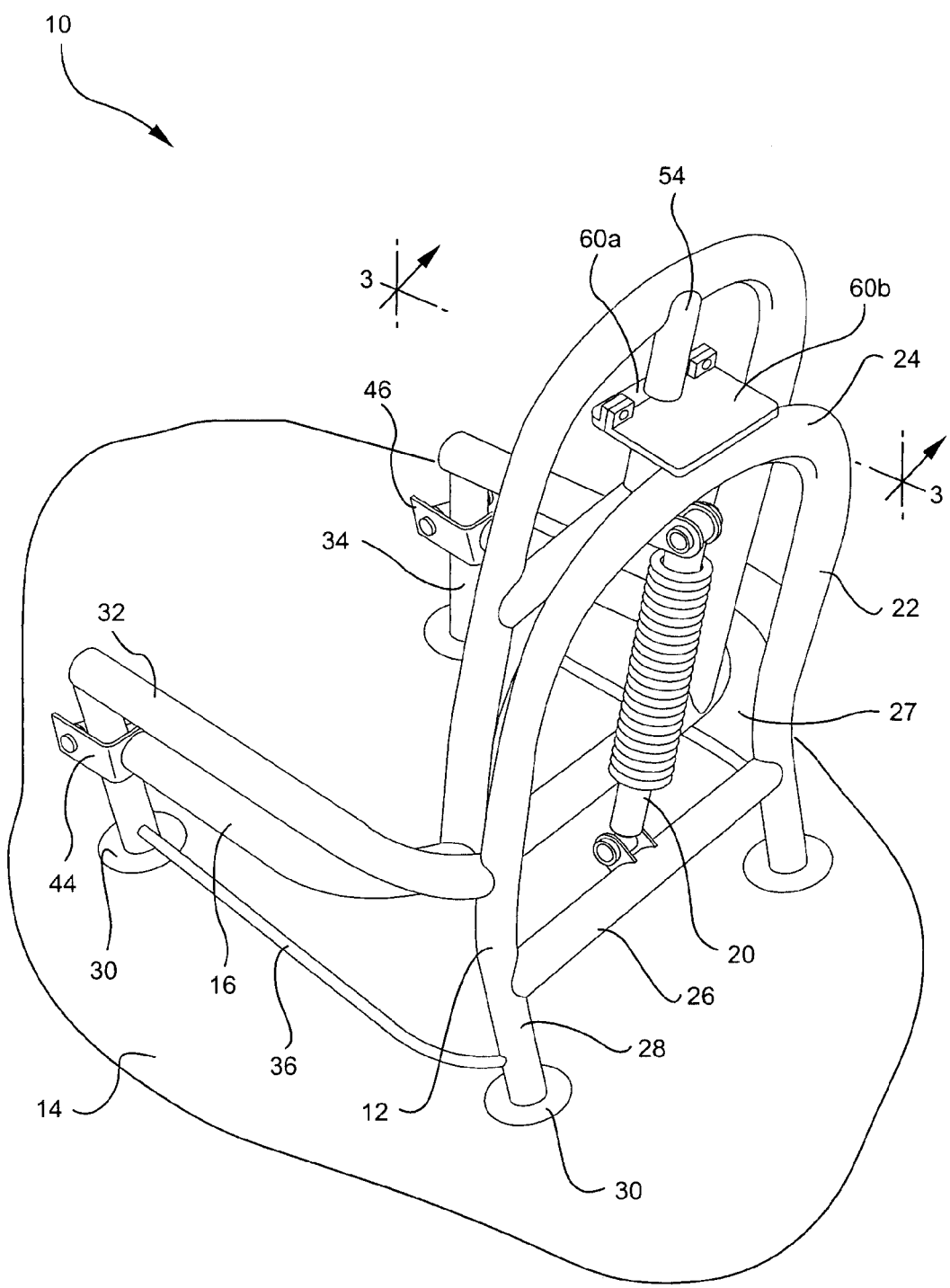
FIG. 1 is top perspective view of the seat suspension assembly of the present invention.

The seat suspension assembly of the present invention provides the ability to absorb shocks imparted to a watercraft or vehicle thereby substantially isolating the occupant of the seat from severe vibrations caused by the impacts. Referring to FIG. 1, the seat suspension assembly 10 of the present invention may be used in a variety of applications, including boats which are subjected to significant impacts as they travel through water. Boats typically include a rigid hull construction and any impact imparted on the hull will be transferred directly to a seat. Even watercraft having inflatable hulls have operational pressures which form a fairly rigid hull resulting in a jarring ride for the occupants. The seat suspension assembly of the present invention provides the ability to somewhat isolate the occupant of the seat from such impacts, thereby reducing the likelihood of injury and allowing for a more comfortable and pleasant ride. In addition, seat suspension assembly 10 permits an occupant who is driving the boat to remain relatively unjarred which increases the ability to properly control the steering wheel and throttle. While the present invention is particularly useful in watercraft, it is within the contemplation of the present invention that the seat suspension assembly may also be employed in other crafts including land vehicles, such as sport utility vehicles and off-road construction equipment. Such vehicles also typically encounter impacts which are transmitted to the vehicle's occupants.

Figure 2:
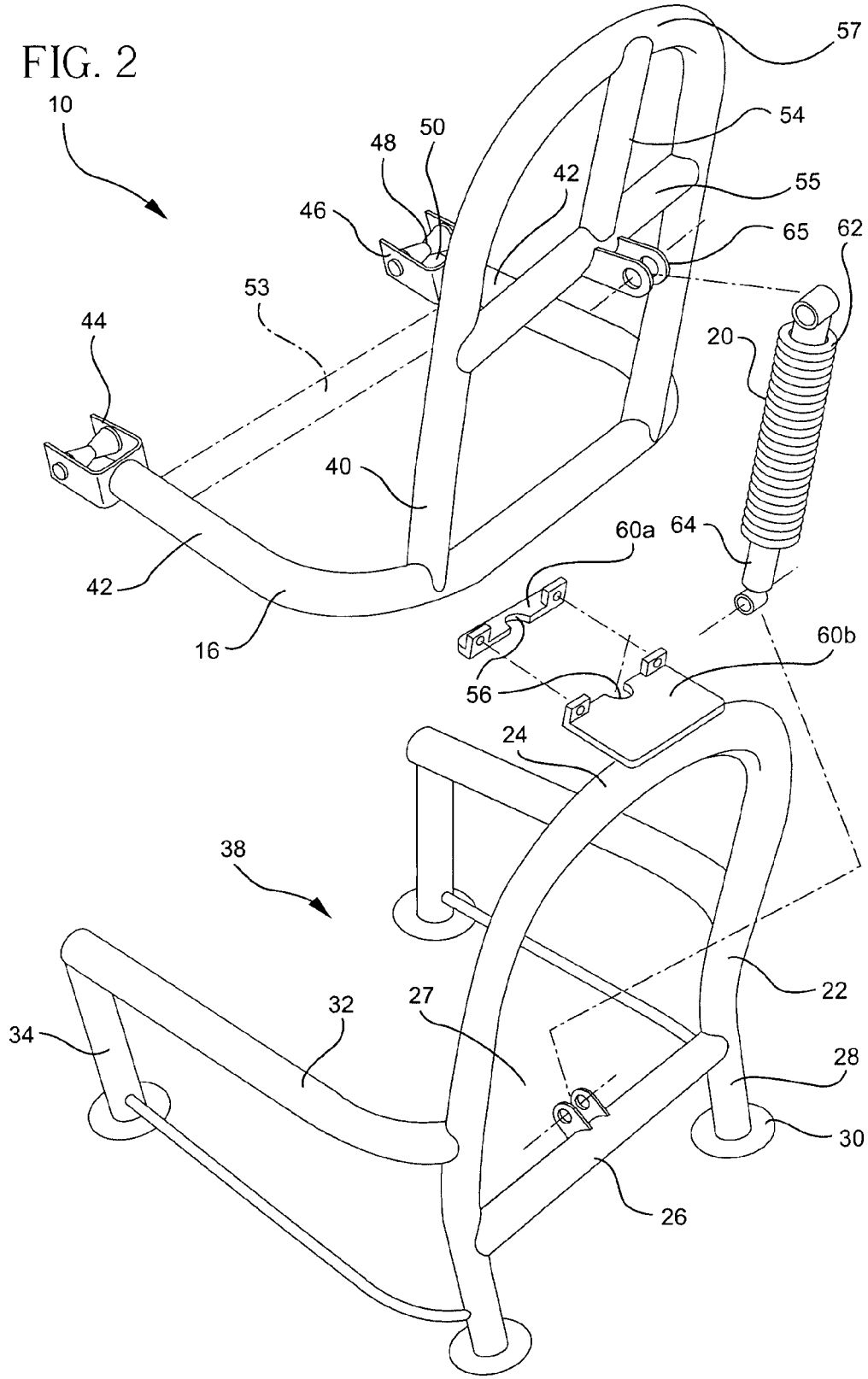
FIG. 2 is an exploded perspective view of the present invention as shown in FIG. 1.
Figure 4:
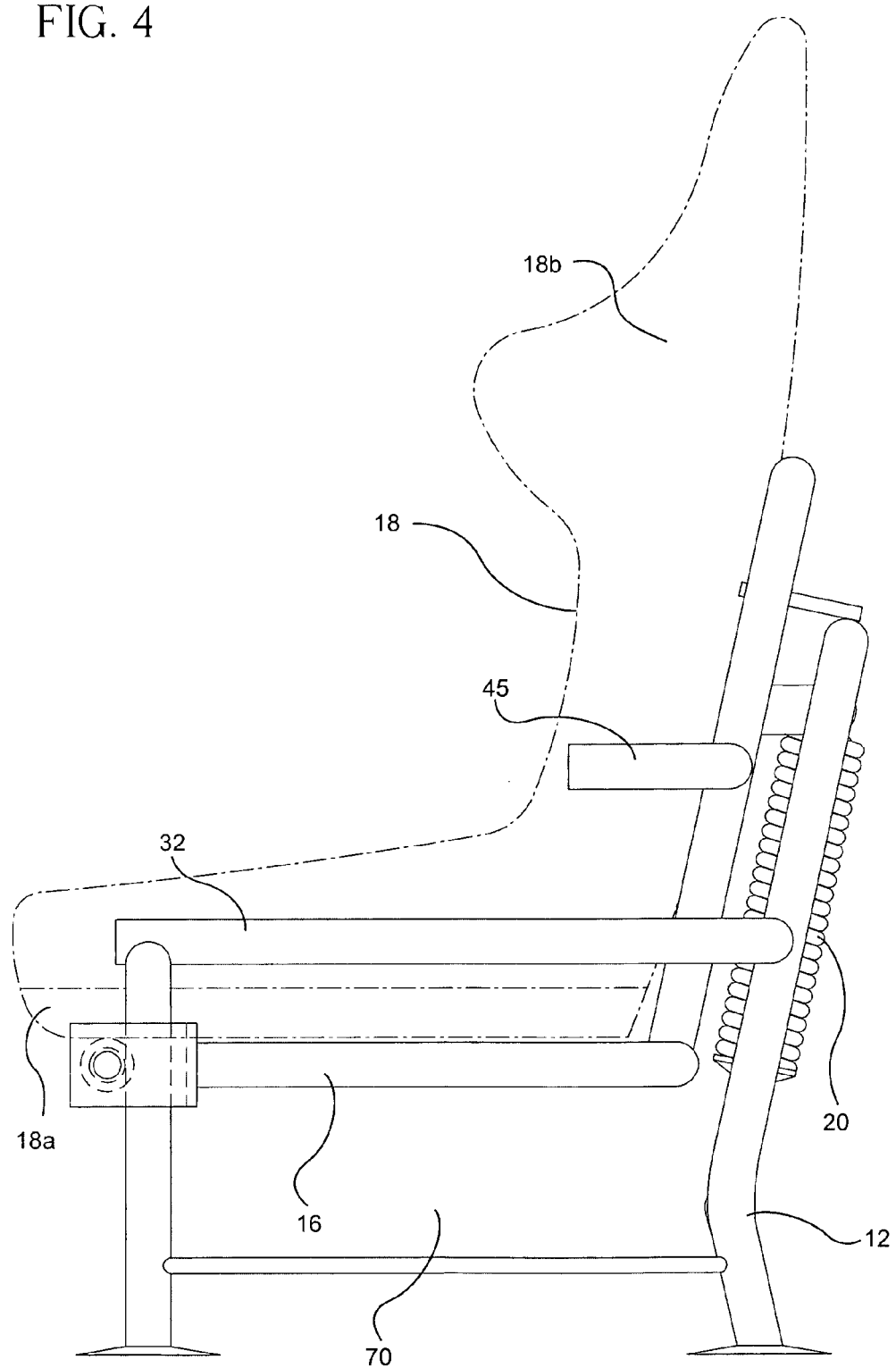
FIG. 4 is a side elevational view of the present invention of FIG. 1.

Referring to FIGS. 1–2 and 4, seat suspension assembly 10 of the present invention includes a base 12 securable to a support structure 14. Support structure 14 may be the deck of a watercraft or floor of a land vehicle. A seat frame 16 is movably secured to base 12 and supports a seat 18. A motion control suspension 20 is disposed between base 12 and seat frame 16 for regulating the motion of seat frame 16 relative to base 12.

Figure 3:
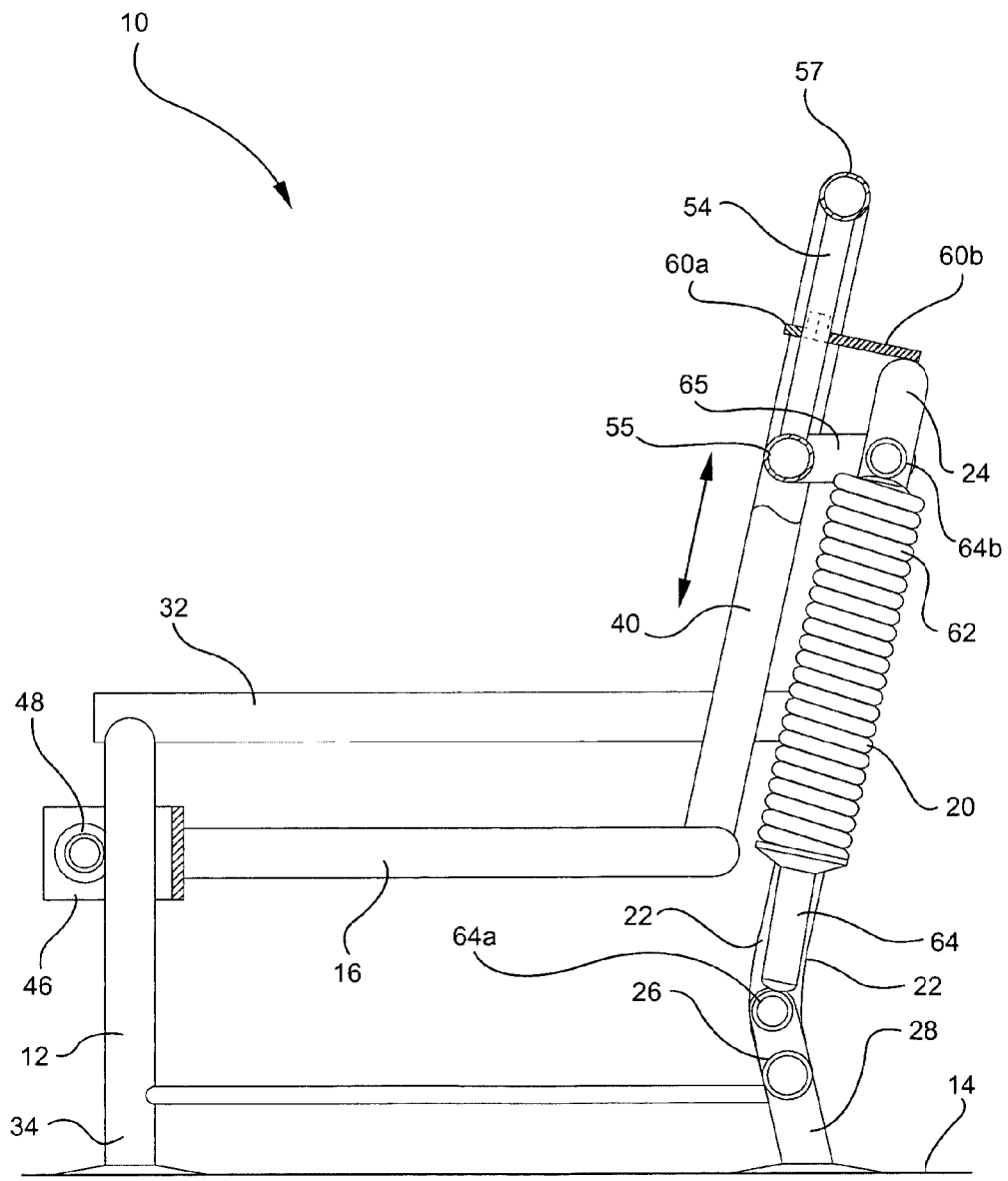
FIG. 3 is a cross-sectional view taken along line 3—3— of FIG. 1.

Referring additionally to FIG. 3, base 12 includes a back member 22 which extends generally vertically. Back member 22 includes a top and bottom cross bar 24 and 26 respectively. In the preferred embodiment, the back member has generally D-shaped configuration having an opening 27. Back member 22 is securable to support structure 14 by a pair of back legs 28 disposed below bottom cross bar 26. Back legs 28 may include at their bottom end a mounting flange 30 for securing the back pair of legs to support structure 14. Extending outwardly from back member 22 is a pair of spaced side rails 32. The distal end of side rails 32 each include a downwardly projecting portion forming a front pair of legs 34. Accordingly, the pair of back legs 28 is connected to front pair of legs by side rails 32. Front pair of legs 34 may also include a mounting flange 30 for securing the legs to support structure 14.

In order to increase rigidity of base 12, a pair of braces 36 may be included extending between the front pair and back pair of legs. Base 12 and its various components may be formed of a rigid material such as aluminum or steel tubing. In order to provide enhanced corrosion resistance desirable in the marine environment, base 12 and its elements may be formed of stainless steel tubing or bar.

Base back member 22 and side rails 32 define an unobstructed open space 38 for receiving seat frame 16. Seat frame 16 may include a back support 40 having a lower end from which extends a pair of spaced arms 42. As shown in FIG. 4, seat 18 may be secured to seat frame 16 by fasteners in a manner well known in the art. Seat may include a ridged shell and padding forming a seating surface 18a and backrest 18b and be formed in a manner well know in the art. While seat 18 may be secured to arms 42 and/ or back member 22, seat frame 16 may include brackets or other structures 45 extending therefrom to permit a particular seat to be properly secured to seat frame 16.

The distal end of each of the pair of arms 42 includes a guide 44. Guides 44 each cooperate with one of the front pair of legs 34 such that one guide cooperated with one front leg 34 and the other guide cooperated with the other front leg 34. In the preferred embodiment, each guide 44 includes a U-shaped member 46 and a grooved roller 48 rotatably secured to the projections 47 which form the U. Each grooved roller 48 and U-shaped member 46 form an opening 50 through which one of the front pair of legs 34 extends. Guides 44 permit vertical movement of seat frame 16 relative to base 12 but limit relative forward, rearward, or side-to-side motion. In an alternative embodiment, the distal ends of arms 42 may be connected by a rigid cross brace 53 (FIG. 2) to provide additional stability to seat frame 16. In the preferred embodiment, seat frame 16 may be formed of aluminum or steel material. Such material may include stainless steel tubing or rod in order to provide a high degree of corrosion resistance.

The movement of seat frame 16 may further be guided through a connection between seat frame back support 40 and base back member 22. In the preferred embodiment, this guiding function is performed by a cooperation between a post 54 disposed on back support 40 and an aperture 56 secured to back member 22. Post 54 may extend between, and be secured to, an upper cross member 55 and an arc-shaped top portion 57. Aperture 56 may be formed in a bushing plate 60, which is rigidly secured to an upper portion of back member 22. Bushing plate 60 may be split into a first 60a and second 60b portion which may be unfasten from each other to permit post 60 to be inserted within aperture 56. Bushing plate 60 may be formed of a bushing material such as nylon or other polymer, or alternatively, formed of a metallic material. Post 54 extends through aperture 56 to permit generally vertical movement of seat frame 16 relative to base 12 but restricts seat frame 16 from moving sideways or forward or backward. Accordingly, seat frame 16 is generally guided at three points in its motion with respect to base 12.

The relative motion between seat frame 16 and base 12 may be controlled in the present invention by a suspension 20. Suspension 20 is preferably positioned between base 12 and seat frame 16. As shown in FIGS. 2 and 3, suspension 20 assists in isolating an occupant of seat 18 from the shocks and vibrations imparted through support structure 14. In the preferred embodiment, motion control suspension 20 may include a biasing device 62 and a dampening device 64. Biasing device 62 may be configured to resist downward motion of seat frame 16 and assist in returning seat frame 16 to a neutral position. Such movement is dampened by dampening device 64 which modifies and controls unwanted relative motion.

Biasing device 62 preferably includes a spring and dampening device 64 may include a shock absorber. These two components may be assembled together in a shock/spring arrangement in a manner known in the art. For example, spring 62 may be disposed concentrically about shock absorber 64. One end of shock absorber 64a may be pivotably secured to base bottom cross bar 26. The other end of shock absorber 64b may be attached via a bracket 65 to the upper portion of back support 40. Bracket 65 extends rearwardly from back support 40. In this arrangement, downward movement of seat frame 16 compresses biasing device 62 and dampening device 64. Spring 62 resists this downward motion as does the dampening device 64. Biasing device 62 tends to urge seat frame 16 into an initial position. This movement will be tempered or dampened by dampening device 64. Accordingly, shocks imparted to base 12 through support structure 14 will be resisted and dampened by suspension 20. This provides a degree of isolation from such shocks to an individual sitting in the seat 18.

In the preferred embodiment, suspension 20 is disposed essentially within the opening 27 created by back member 22. Therefore, suspension 20 is disposed behind seat frame 16 and not under it, thereby permitting a very compact and efficient design. In land vehicles and watercraft, space is often at a premium and a more compact design is desirable. A compact design also permits the present invention to be used in retrofit applications where an existing seating structure is removed and replaced with the present invention. In such applications, the envelope for receiving a seating structure can be fairly tight-allowing room for the seating structure and little more. The present invention may be employed in such applications due to its compact design.

As set forth above, seat suspension assembly 10 of the present invention maintains a relatively open and unobstructed area beneath seating surface 18a. This feature allows the seat to be employed in further applications which permit the seat's occupant to selectively sit or stand. In certain boating environments, it is customary for the boat seat to be spaced above the hull such that there is clearance for the seating surface to be swung down out of the way, thereby permitting the occupant to stand. For example, it may be desirable to assume a standing position for visibility purposes when maneuvering the boat in docking situations.

Figure 5:
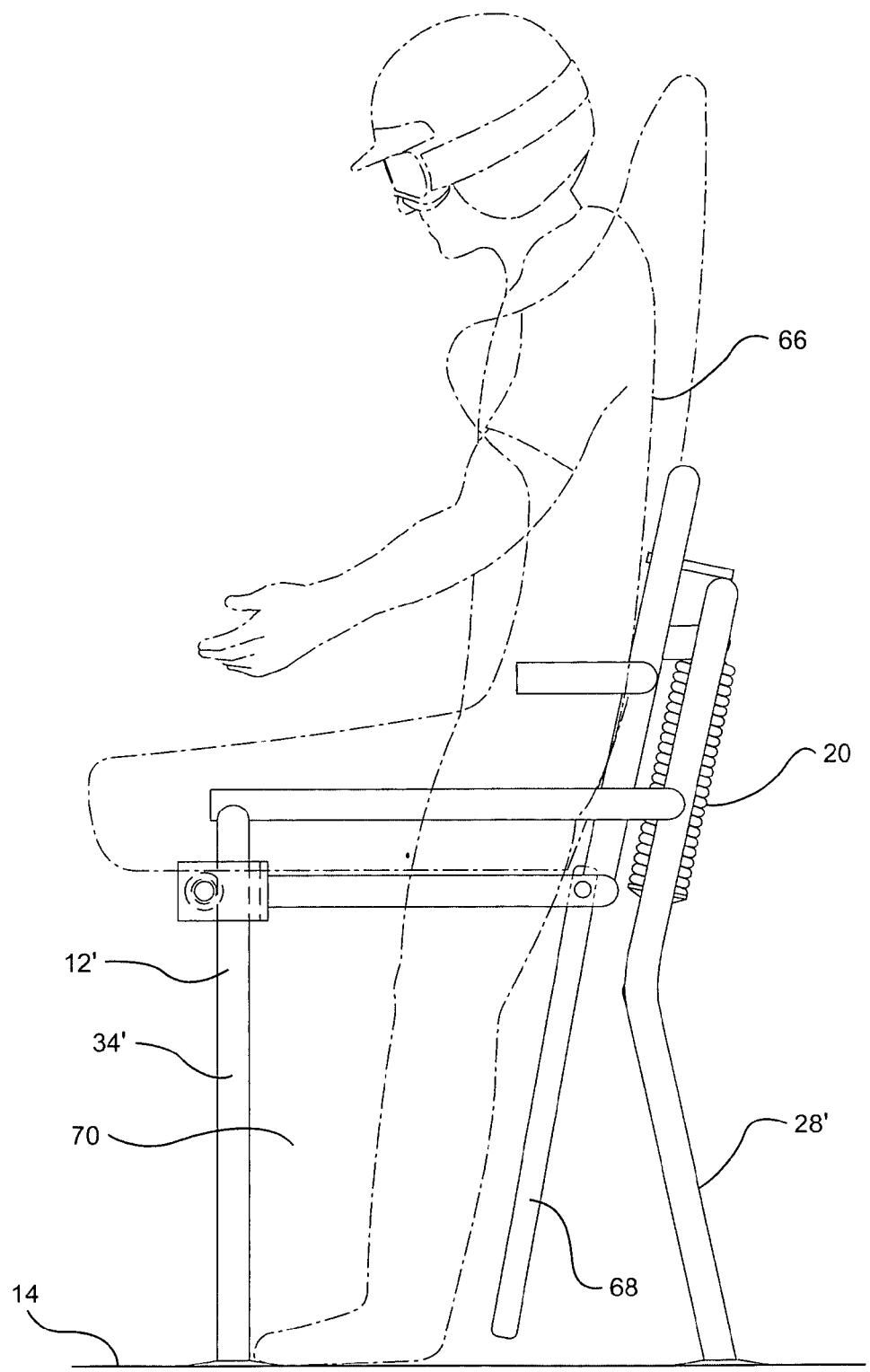
FIG. 5 is a side elevational view of an alternative embodiment of the present invention.

Referring to FIG. 5, since the seat suspension assembly 10 of the present invention does not include components disposed below the seating surface, a seat 66 of the present invention may include a modified seating surface 68 which is hinged along a back edge 74 or side edge (not shown) to allow the seat to swing down out of the way. In this alternative embodiment, base 12' may have front and back legs 34' and 28' that are extended in length such that seating surface 68' is raised above support structure 14 to an extent to permit seat surface to rotate to a substantially vertical position. A latch assembly (not shown) formed in a manner well known in the art, may be provided to selectively secure and release seating surface 68' in the vertical position.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A seat suspension assembly comprising:
   a base including a first pair of spaced legs adapted to be securable to a support structure, said first pair of legs being connected to a back member;
   a seat frame adapted to support a seating surface and disposed between said first pair of spaced legs of said base, said seat frame being movably connected to said base, said seat frame including a first guide engageable with one leg of said pair of legs and translatable relative thereto, said first guide permitting controlled movement of said seat frame relative to said base, and said seat frame including a back support having a pair of bottom rails extending outwardly therefrom, each of said bottom rails having a distal end and said first guide being disposed on one distal end and a second guide being disposed on said other distal end; and
   a suspension extending between said seat frame and said base for regulating motion of said seat frame relative to said base.

2. The seat suspension assembly as defined in claim 1, wherein said suspension includes a biasing device.

3. The seat suspension assembly as defined in claim 2, wherein said suspension includes a dampening device.

4. The seat suspension assembly as defined in claim 1, wherein said base includes a cross bar and said seat frame includes a back support, said suspension extends between said base cross bar and said seat frame back support.

5. The seat suspension assembly as defined in claim 4, wherein said base includes a second pair of spaced legs extending therefrom adapted to be secured to the support structure, and said first pair of spaced legs being connected to said second pair of legs by a pair of side rails.

6. The seat suspension assembly as defined in claim 5, wherein said base cross bar and said pair of side rails define an open space to receive said seat frame.

7. The seat suspension assembly as defined in claim 1, wherein said first guide movably engages one of said first legs and said second guide movably engages said other of said first legs.

8. The seat suspension assembly as defined in claim 1, wherein said first and second guides include a roller.

9. The seat suspension assembly as defined in claim 4, wherein said back support includes a post extending upwardly therefrom and a back member having an aperture, said post being slidingly disposed within said aperture for providing guided support for movement of said seat frame relative to said base.

10. A seat suspension assembly comprising:
a base including a first pair of spaced legs adapted to be securable to a support structure, said first pair of legs being connected to a back member, said back member defining an opening;
a seat frame adapted to support a seating surface and disposed between said first pair of spaced legs, said seat frame being movably connected to said base, said seat frame including a first guide engageable with one leg of said first pair of legs and translatable relative thereto, said first guide permitting controlled movement of said seat frame relative to said base, and said base including a cross bar and said seat frame includes a back support, said base cross bar including a second pair of spaced legs extending therefrom and adapted to be secured to the support structure; and
a suspension substantially disposed within said opening defined by said back member and extending between said seat frame and said base for regulating motion of said seat frame relative to said base, and said suspension extending between said base cross bar and said seat frame back support.

11. The assembly as defined in claim 10, wherein said seat frame includes a second guide engageable with the other leg of said first pair of legs.

12. The assembly as defined in claim 10, wherein said seat frame includes a back support having a pair of bottom rails extending outwardly therefrom, each of said bottom rails having a distal end and said first guide being disposed on one distal end and a second guide being disposed on said other distal end.

13. The assembly as defined in claim 12, wherein each of said guides engages one of said first pair of legs.

14. The assembly as defined in claim 10, wherein said back member includes a cross bar and said frame back support includes an upper portion and said suspension extends between and is pivotally secured to said cross bar and said back support upper portion such that said suspension is disposed behind said seat frame.

15. The assembly as defined in claim 10, wherein said suspension includes a biasing member.

16. The assembly as defined in claim 15, wherein said suspension includes a dampening member.

17. The assembly as defined in claim 10, wherein said biasing member is disposed about and concentrically aligned with said dampening member.

18. The assembly as defined in claim 12, wherein said frame back support is slidably connected to said base back member.

19. The assembly as defined in claim 18, wherein said seat frame back support includes a post and said base back member includes an opening which receives said post.

20. The assembly as defined in claim 19, wherein said opening is formed in a plate secured to an upper portion of said base back member.

21. A seat suspension assembly securable to a support structure comprising:
a base securable to the support structure, said base including a back member and a pair of spaced side rails extending outwardly from said back member, said back member and said pair of side rails forming an open space, and said base including a first and second pair of space legs connected together by said pair of spaced side rails;
a seating surface;
a seat frame adapted to support said seating surface and generally disposed in said open space, said seat frame being movably connected in a guided manner to said base, said seat frame including a back support and a pair of spaced arms, said seat frame being movably connected to said base by a pair of first guides disposed on said arms, said guides engaging and being translatable relative to said first pair of legs, said back support and said spaced arms forming an opening, wherein an area below said seating surface is generally unobstructed providing unencumbered access to the support structure, and said seat frame is movably connected to said base by a pair of first guides disposed on said arms, said first guides engaging said first pair of legs, and said seat frame back support is movingly connected to said base back member by a second guide; and
a suspension including a biasing device and a dampening device, said suspension extending between said seat frame back support and said base for regulating the motion of said seat frame relative to said base, said suspension being disposed outside of said opening created by said seat frame.

22. The assembly as defined in claim 21, wherein said seating surface is pivotally secured to said frame and is selectively rotatable between an generally horizontal position and a vertical position.

23. A seat suspension assembly comprising:
a base including a first and second pair of spaced legs adapted to be securable to a support structure said first pair of spaced legs being connected to said second pair of legs, said first pair of legs being connected to a back member, said back member defining an opening, and said base having a cross bar including said second pair of legs extending therefrom;
a seat frame adapted to support a seating surface and disposed between said first pair of spaced legs, said seat frame being movably connected to said base, said seat frame including a first guide engageable with one leg of said first pair of legs, said first guide permitting controlled movement of said seat frame relative to said base, said seat frame including a back support; and
a suspension substantially disposed within said opening defined by said back member and extending between said seat frame back support and said base cross bar for regulating motion of said seat frame relative to said base.

24. A seat suspension assembly comprising:
a base including a first pair of spaced legs adapted to be securable to a support structure, said first pair of legs being connected to a back member, said back member defining an opening;
a seat frame adapted to support a seating surface and disposed between said first pair of spaced legs, said seat frame being movably connected to said base, said seat frame including a first guide engageable with one of said first pair of legs, said first guide permitting controlled movement of said seat frame relative to said base, said seat frame including a back support having a pair of bottom rails extending outwardly therefrom, each of said bottom rails having a distal end and said first guide being disposed on one distal end and a second guide being disposed on said other distal end said seat frame back support is slidably connected to said base back member, and said seat frame back support includes a post and said base back member includes an opening which receives said post; and a suspension substantially disposed within said opening defined by said back member and extending between said seat frame and said base for regulating motion of said seat frame relative to said base.

25. A seat suspension assembly securable to a support structure comprising:

a base securable to the support structure, said base including a back member and a pair of spaced side rails extending outwardly from said back member, said back member and said pair of side rails forming an open space, said base including a first and second pair of space legs connected together by said pair of spaced side rails;

a seating surface;

a seat frame adapted to support said seating surface and generally disposed in said open space, said seat frame being movably connected in a guided manner to said base, said seat frame including a back support and a pair of spaced arms, said back support and said spaced arms forming an opening, wherein an area below said seating surface is generally unobstructed providing unencumbered access to the support structure, said seat frame being movably connected to said base by a pair of first guides disposed on said arms, said first guides engaging said first pair of legs, and said seat frame back support being movably connected to said base back member by a second guide; and a suspension extending between said seat frame back support and said base for regulating the motion of said seat frame relative to said base, said suspension being disposed outside of said opening created by said seat frame.

26. A seat suspension assembly comprising:

a base including a first pair of spaced legs adapted to be securable to a support structure, said first pair of legs being connected to a back member, and said base including a cross bar;

a seat frame adapted to support a seating surface and disposed between said first pair of spaced legs of said base, said seat frame being movably connected to said base, said seat frame including a first guide engageable with one leg of said pair of legs and translatable relative thereto, said first guide permitting controlled movement of said seat frame relative to said base, said seat frame including a back support having a post extending upwardly therefrom and said back member having an aperture, said post being slidingly disposed within said aperture for providing guided support for movement of said seat frame relative to said base; and a suspension extending between said base cross bar and said seat frame back support for regulating motion of said seat frame relative to said base.

27. A seat suspension assembly comprising:

a base including a first pair of spaced legs adapted to be securable to a support structure, said first pair of legs being connected to a back member, said back member defining an opening;

a seat frame adapted to support a seating surface and disposed between said first pair of spaced legs, said seat frame being movably connected to said base, said seat frame including a back support having a pair of bottom rails extending outwardly therefrom, each of said bottom rails having a distal end and a first guide being disposed on one of said distal ends and a second guide being disposed on said other of said distal ends, said first guide being engageable with one leg of said first pair of legs and translatable relative thereto, said first guide permitting controlled movement of said seat frame relative to said base; and a suspension substantially disposed within said opening defined by said back member and extending between said seat frame and said base for regulating motion of said seat frame relative to said base.

28. A seat suspension assembly securable to a support structure comprising:

a base securable to the support structure, said base including a back member and a pair of spaced side rails extending outwardly from said back member, said back member and said pair of side rails forming an open space;

a seating surface being pivotally secured to said frame and selectively rotatable between an generally horizontal position and a vertical position;

a seat frame adapted to support said seating surface and generally disposed in said open space, said seat frame being movably connected in a guided manner to said base, said seat frame including a back support and a pair of spaced arms, said seat frame being movably connected to said base by a pair of first guides disposed on said arms, said guides engaging and being translatable relative to said first pair of legs, said back support and said spaced arms forming an opening, wherein an area below said seating surface is generally unobstructed providing unencumbered access to the support structure; and a suspension extending between said seat frame back support and said base for regulating the motion of said seat frame relative to said base, said suspension being disposed outside of said opening created by said seat frame.

* * * * *